United States Patent
Geer

(10) Patent No.: US 7,170,656 B2
(45) Date of Patent: *Jan. 30, 2007

(54) AUTOMATIC SLIDE FEEDER

(75) Inventor: Lisa M. Geer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

This patent is subject to a terminal disclaimer.

(21) Appl. No.: 10/691,909

(22) Filed: Oct. 22, 2003

(65) Prior Publication Data

US 2004/0080794 A1 Apr. 29, 2004

Related U.S. Application Data

(63) Continuation of application No. 09/478,636, filed on Jan. 6, 2000, now Pat. No. 6,639,697.

(51) Int. Cl.
*H04N 1/04* (2006.01)
(52) U.S. Cl. .................. 358/487; 358/474; 250/234
(58) Field of Classification Search ........... 358/474, 358/487; 250/234; 356/444; 271/84; 399/64
See application file for complete search history.

(56) References Cited

U.S. PATENT DOCUMENTS

| 5,463,217 | A | 10/1995 | Sobol et al. |
| 5,949,524 | A | 9/1999 | Patton et al. |
| 5,995,204 | A | 11/1999 | Hoshino et al. |
| 6,018,161 | A | 1/2000 | Batten et al. |
| 6,304,344 | B1 | 10/2001 | Brandestini et al. |
| 6,639,697 | B1 * | 10/2003 | Geer .................... 358/487 |

* cited by examiner

*Primary Examiner*—Thomas D. Lee
*Assistant Examiner*—Heather D Gibbs

(57) ABSTRACT

An automatic slide feeder according to one embodiment of the present invention may comprise a housing configured to define an input slide tray, an output slide tray and a scan slide tray. A slide actuator operatively associated with the housing moves a slide from the input slide tray to the scan slide tray. A control system operatively associated with the slide actuator and a document scanner operates the document scanner to scan a slide positioned in the scan slide tray and operates the slide actuator to move a new slide from the input slide tray to the scan slide tray after the slide positioned in the scan slide tray has been scanned.

10 Claims, 5 Drawing Sheets

AUTOMATIC SLIDE FEEDER

CROSS-REFERENCE TO RELATED APPLICATION

This is a continuation of U.S. patent application Ser. No. 09/478,636, filed on Jan. 6, 2000 now U.S. Pat. No. 6,639, 697, which is incorporated herein by reference for all that it discloses.

FIELD OF INVENTION

This invention relates to optical scanners in general and more specifically to devices for allowing optical scanners to scan transparent images such as slides and negatives.

BACKGROUND

Scanner devices, such as flatbed scanners, are well-known in the art and produce machine-readable image data signals that are representative of a scanned object, such as a photograph or a page of printed text. In a typical scanner application, the image data signals produced by the scanner may be used by a personal computer to reproduce an image of the scanned object on a suitable display device, such as a CRT or a printer.

A typical flatbed scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the illumination and optical systems with respect to the object.

By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector. Alternatively, a so-called "contact image sensor" (CIS) may be used to collect and focus light from the illuminated scan region onto the detector.

The photosensitive detector used to detect the image light focused thereon by the optical system may comprise a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

While scanner devices of the type described above are known and are widely used, it is often desirable to scan transparent images, such as slides or negatives. Unfortunately, however, such reflective type scanner devices are not well-suited for scanning transparent images, such as slides or negatives, since they are designed to detect light that is reflected by the image to be scanned. Accordingly, if such a reflective type scanner is to be used to scan transparent images, some means of directing light through the image must be provided. The transmitted light is then detected by the image sensor of the scanner and processed in a conventional manner.

One such device that allows reflective type scanners to scan transparent images is described in U.S. Pat. No. 5,463, 217 issued to Sobol et al., and entitled "Adapter for Scanning Transparencies with a Reflective Document Scanner" which is hereby incorporated herein by reference for all that it discloses. Sobol et al. describe a completely passive adapter for scanning transparent images with a reflective scanner without requiring a separate light source for back lighting the transparent image. Instead, the adapter utilizes one or more mirrors to capture and re-direct through the transparent image light produced by the scanner light source. While the adapter works well and eliminates the need to provide a separate light source, the user must manually place the transparent image within the adapter before the transparent image can be scanned. If the user desires to scan a plurality of such transparent images, he or she first must place each individual transparent image within the adapter, then actuate the scanner in order to scan the image. While this procedure is effective from a functional standpoint, it is relatively time-consuming, cumbersome, and carries an increased risk that the transparent image may become damaged due to the excessive handling involved.

SUMMARY OF THE INVENTION

An automatic slide feeder according to one embodiment of the present invention may comprise a housing configured to define an input slide tray, an output slide tray and a scan slide tray. A slide actuator operatively associated with the housing moves a slide from the input slide tray to the scan slide tray. A control system operatively associated with the slide actuator and a document scanner operates the document scanner to scan a slide positioned in the scan slide tray and operates the slide actuator to move a new slide from the input slide tray to the scan slide tray after the slide positioned in the scan slide tray has been scanned.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
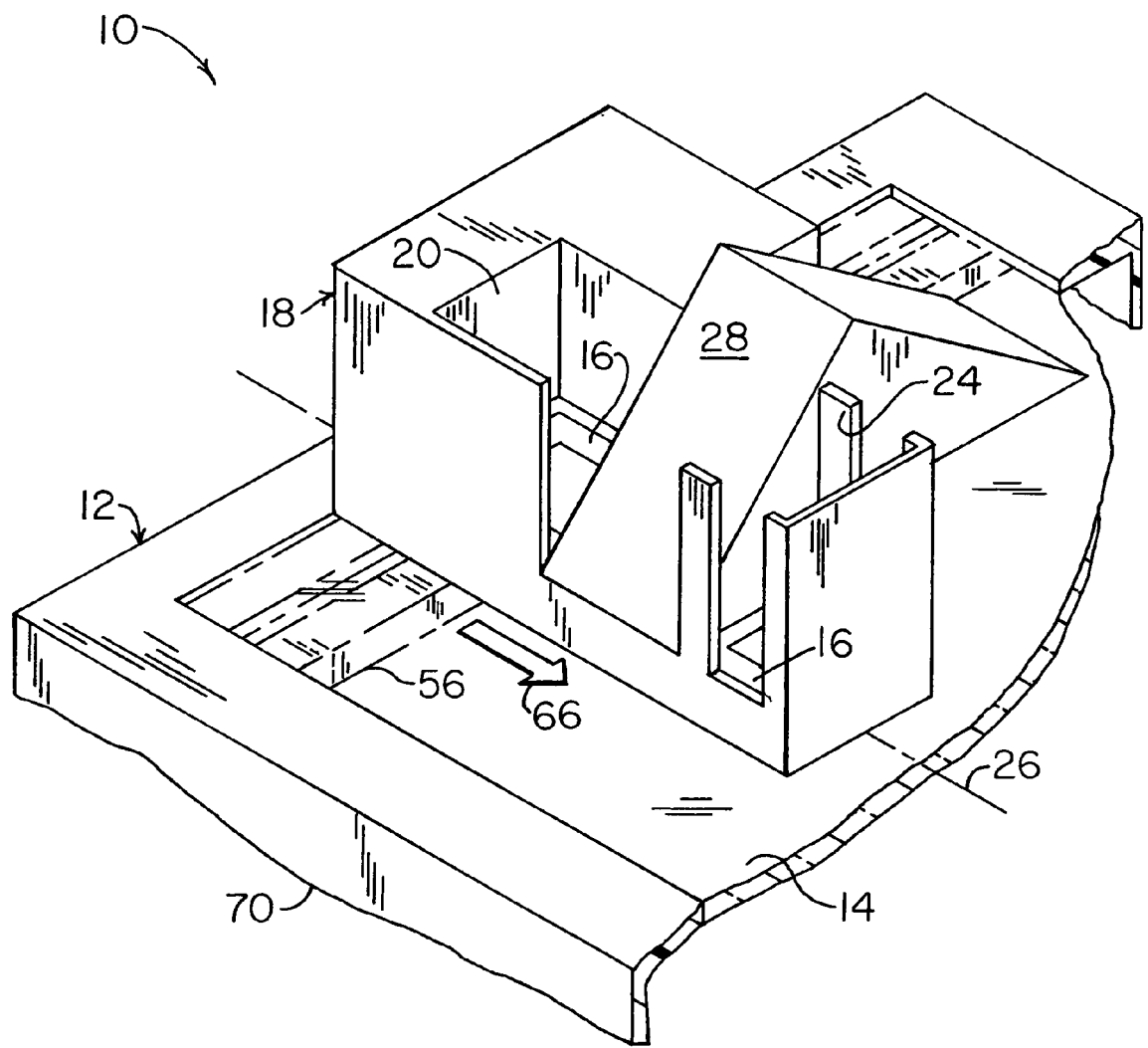
FIG. 1 is a perspective view of an automatic slide feeder according to one embodiment of the present invention shown as it could be used with a flatbed document scanner.

An automatic slide feeder 10 according to one embodiment of the present invention is shown in FIG. 1 as it could be used in conjunction with a reflective-type "flatbed" document scanner 12. As is well-known, the document scanner 12 may include a transparent platen 14 that is designed to receive a document or object (not shown) to be scanned. The automatic slide feeder 10 of the present invention is designed to be placed on the transparent platen 14 of document scanner 12 so that a slide or slides 16 positioned therein may be scanned by the document scanner 12.

Figure 2:
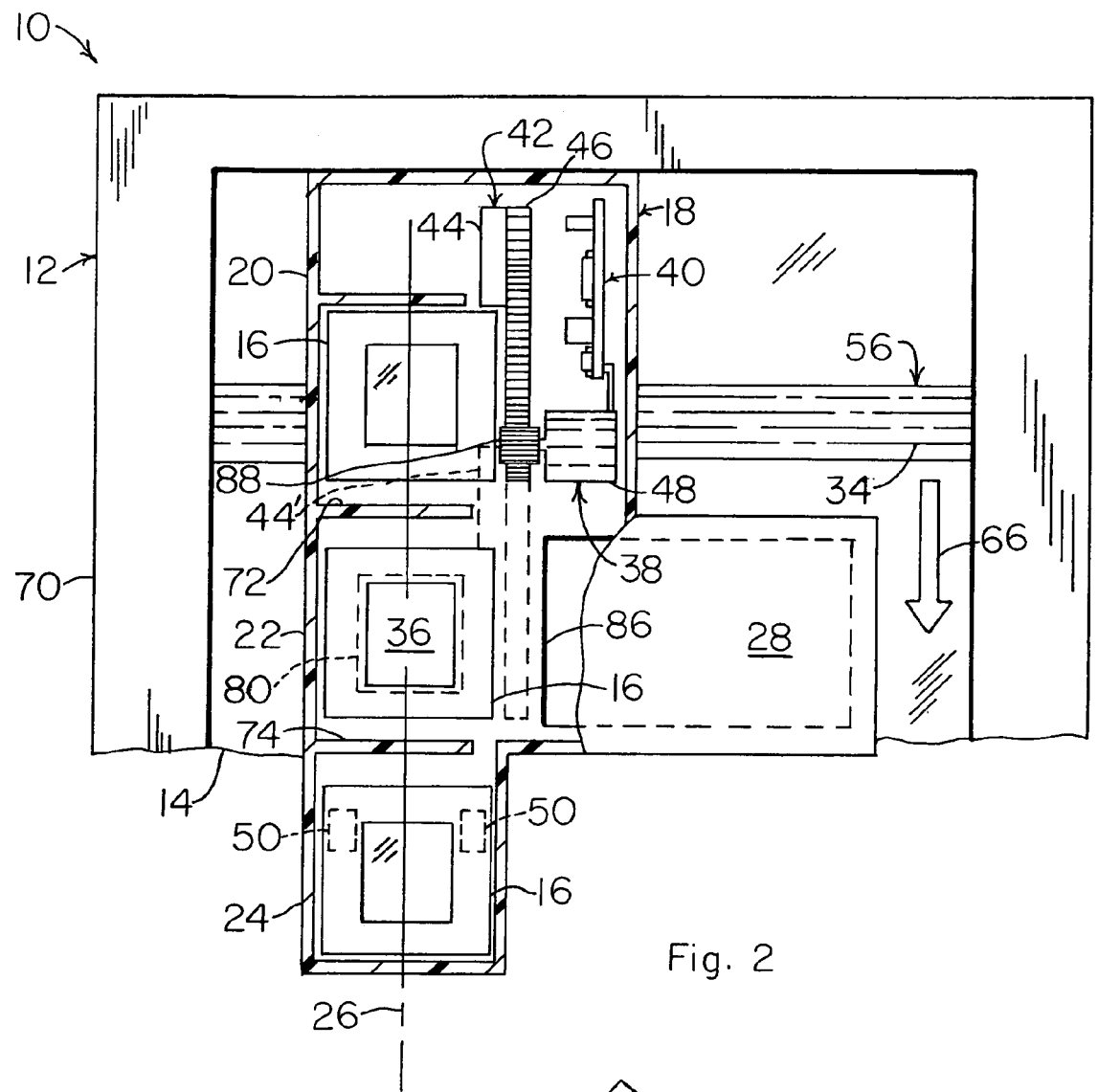
FIG. 2 is a plan view of the automatic slide feeder shown in FIG. 1 with a portion of the housing broken away to show the positions of the various slide trays and the details of the slide actuator system.
Figure 3:
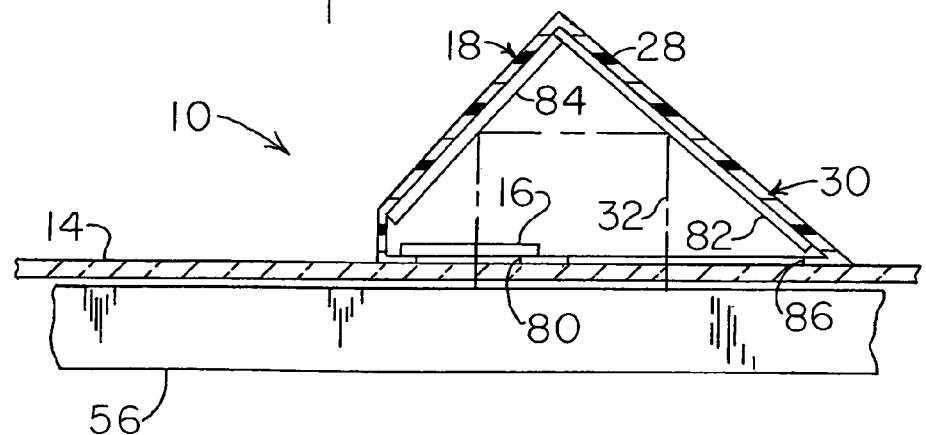
FIG. 3 is a front view in elevation of the mounting structure for the mirror assembly of the automatic slide feeder with a portion of the mounting structure broken away to show how the mirror assembly reflects light from the scanner light source through a slide positioned in the scan tray.

Referring now to FIGS. 1 and 2 simultaneously, the automatic slide feeder 10 may comprise a housing 18 which defines various slide trays and mounting areas for various components comprising the automatic slide feeder 10. For example, in the embodiment shown and described herein, the housing 18 is configured to define three slide trays: An input slide tray 20, a scan slide tray 22 (best seen in FIG. 2), and an output slide tray 24. The various slide trays 20, 22, and 24 are positioned side-by-side along a slide translation axis 26 so that the scan slide tray 22 is positioned between the input slide tray 20 and the output slide tray 24. The housing 18 of automatic slide feeder 10 also defines a generally triangularly-shaped mounting structure 28 for holding a mirror assembly 30. As will be described in greater detail below, the mirror assembly 30 collects image or scanning light (represented by arrows 32) produced by a light source 34 contained within the document scanner 12 and reflects the image light 32 through a transparent image area 36 contained in the slide 16 that is positioned in the scan tray 22. See FIG. 3. Finally, the housing 18 may also contain a slide actuator system 38 for moving slides 16 between the various slide trays 20, 22, and 24, and a control system 40 for controlling the slide actuator system 38 and for coordinating the operation of the automatic slide feeder 10 with the document scanner 12 in a manner that will be described in greater detail below.

With reference now to FIG. 2, the slide actuator system 38 may comprise a pawl 42 that is moveably mounted within the housing 18 so that the pawl 42 may be moved between a retracted position 44 and an extended position 44'. In one preferred embodiment, the pawl 42 is mounted to a gear rack 46 which may be driven by a motor 48 to accomplish movement of the pawl 42 between the retracted and extended positions 44 and 44'. Alternatively, other types of drive systems may be used, as will be described in greater detail below. The slide actuator system 38 may be used to transfer slides 16 from the input slide tray 20 to the scan tray 22, and thence to the output slide tray 24. This movement of the slides allows the automatic slide feeder 10 to automatically and sequentially position the various slides 16 in the scan tray 22 so that the same may be scanned by the document scanner 12.

The operation of the slide actuator system 38 is best understood by referring to FIGS. 4–7. Consider, for example, an initial condition illustrated in FIG. 4, wherein a plurality of slides 16 to be scanned are contained in the input slide tray 20. Suppose also that a slide 16 is positioned in the scan tray 22 and that another slide 16 is positioned in the output slide tray 24. Of course, this initial condition and placement of slides is illustrative only and other initial conditions may also be possible. For example, in most applications, the automatic slide feeder 10 will initially contain one or more slides 16 in the input slide tray 20, but no slides 16 in either the scan slide tray 22 or the output slide tray 24. Only after the slide actuator is operated two times will the automatic slide feeder 10 contain slides 16 in scan slide tray 22 and the output slide tray 24. Continuing now with the description, once the slide 16 contained in the scan tray 22 has been scanned by the document scanner 12, it may be moved from the scan tray 22 into the output tray 24. A new slide 16 to be scanned may then be moved into position in the scan tray 22. This transfer or movement of the slides is accomplished by the slide actuator 38.

Figure 4:
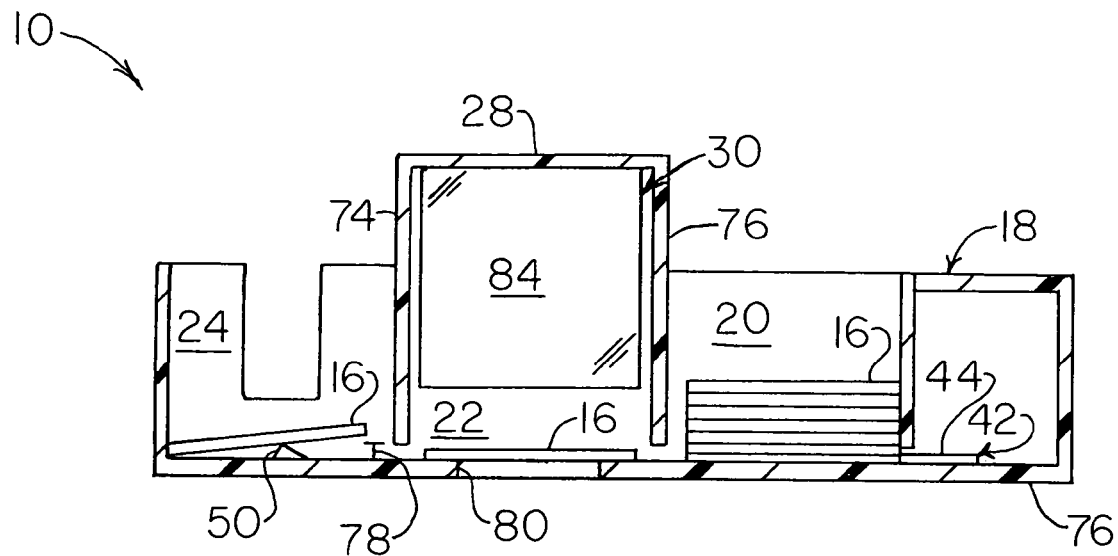
FIG. 4 is a side view in elevation of the automatic slide feeder with a portion of the housing broken away to show the positions and orientations of slides in the various slide trays.
Figure 5:
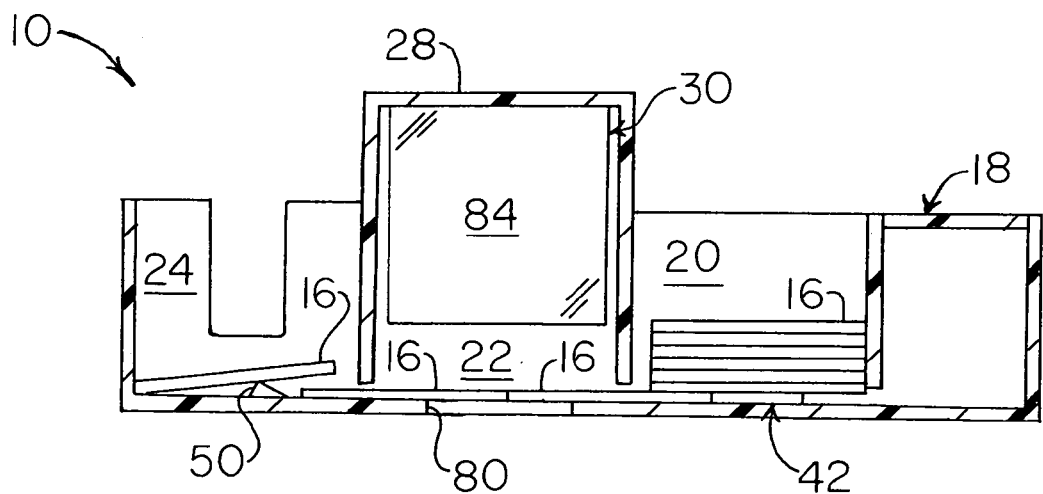
FIG. 5 is a side view in elevation of the automatic slide feeder with a portion of the housing broken away to show a new slide from the input slide tray being used to move a previously scanned slide from the scan tray into the output slide tray.
Figure 6:
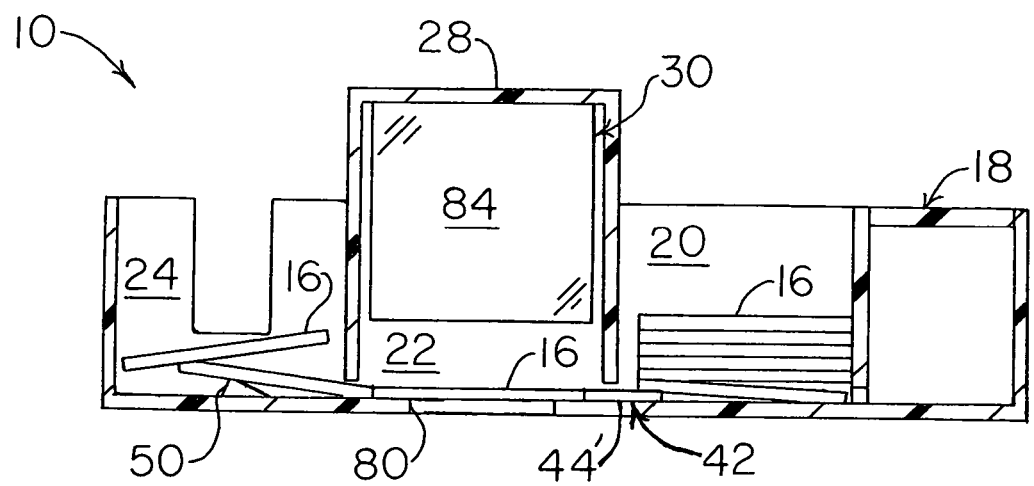
FIG. 6 is a side view in elevation of the automatic slide feeder with a portion of the housing broken away to show the pawl in the extended position.
Figure 7:
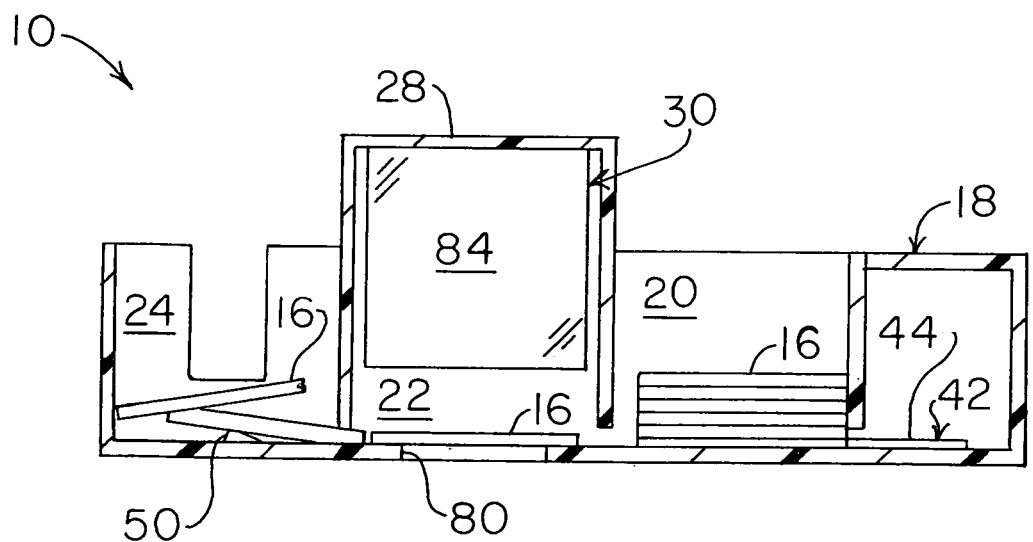
FIG. 7 is a side view in elevation of the automatic slide feeder with a portion of the housing broken away to show the pawl returned to the retracted position.

Initially, the pawl 42 of the slide actuator 38 is located in the retracted position 44, as best seen in FIGS. 2 and 4. When the pawl 42 is located in the retracted position, it may be adjacent, or even in abutting relation to, the bottom slide 16 contained in the input slide tray 20. When the slide actuator system 38 is activated, it begins to move the pawl 42 toward the extended position 44' (FIGS. 2 and 6). As pawl 42 moves toward the extended position 44', it moves the bottom slide 16 contained in the input slide tray 20 toward the scan tray 22. As this new slide 16 is moved into position, its leading edge contacts the trailing edge of the slide 16 that is already contained in the scan tray 22. This contact causes the previously scanned slide 16 to move to the left toward the output slide tray 24. See FIG. 5. A pair of ramps 50 (FIG. 2) contained in the output slide tray 24 elevate the trailing edge of slide 16 contained in the output slide tray 24 which allows the previously scanned slide 16 to move underneath the slide 16 contained in the output slide tray 24. As the pawl 42 continues to move toward the extended position 44' (FIGS. 2 and 6) it pushes both the slide 16 to be scanned and the most recently scanned slide 16 toward the scan and output trays 22 and 24, respectively, until the new slide 16 to be scanned is positioned within the scan tray 22. At this point, the most recently scanned slide 16 is positioned underneath the slide 16 contained in the output slide tray 24. See FIG. 6. Note that when the pawl 42 is in the extended position 44' the trailing edge of pawl 42 remains positioned underneath the lower-most slide 16 contained in the input slide tray 20. This arrangement allows the pawl 42 to be returned to the retracted position 44 (illustrated in FIG. 7) without moving the lower-most slide 16 contained in the input slide tray 20. Once the pawl 42 reaches the retracted position 44, the lower-most slide 16 contained in the input slide tray 20 drops down, allowing the lower-most slide 16 to be subsequently moved into position in the scan tray 22 by the slide actuator system 38.

Figure 8:
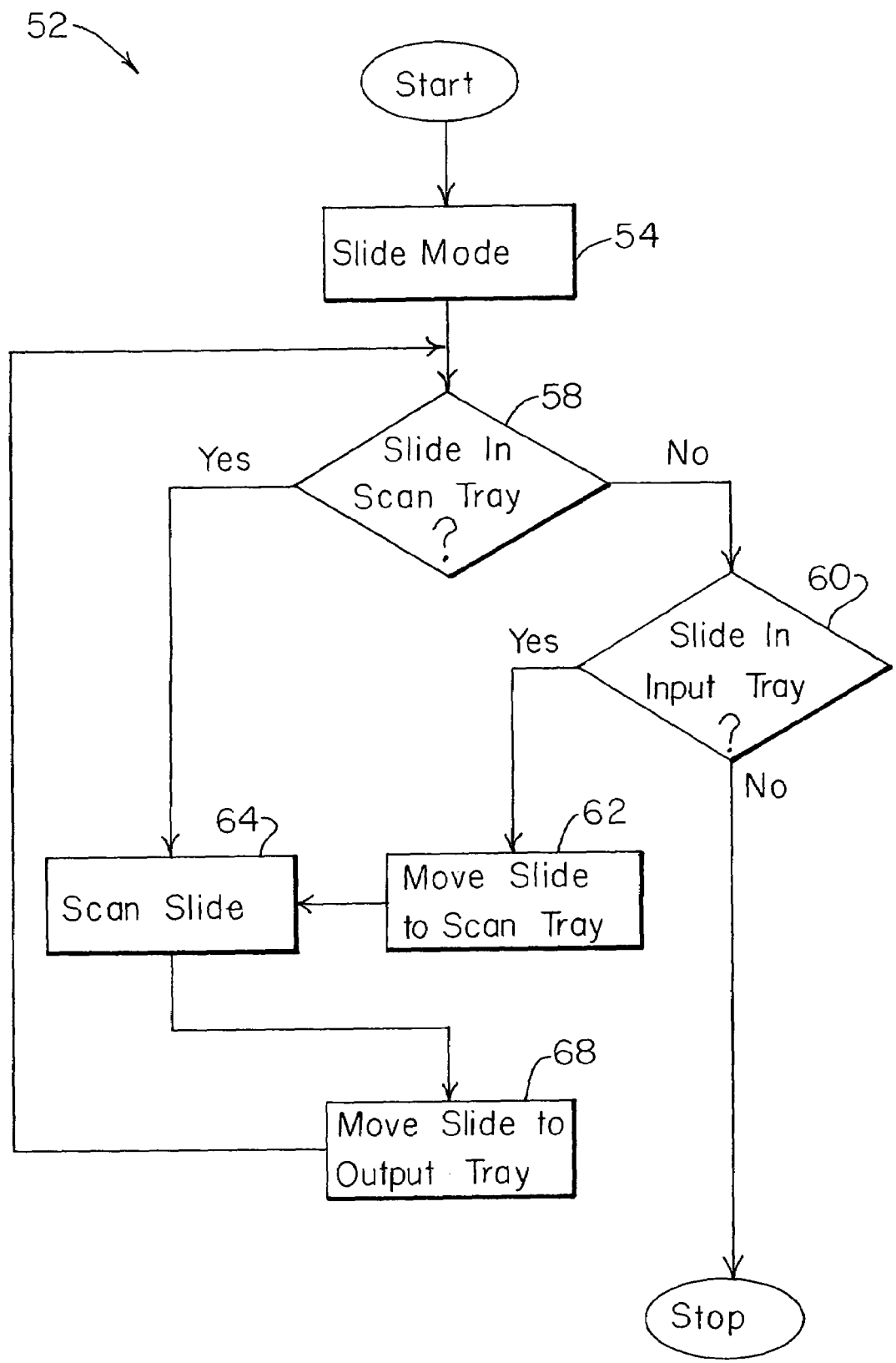
FIG. 8 is a flow chart schematic illustrating the method of scanning slides according to one embodiment of the present invention.

As was mentioned above, the control system 40 provided in the automatic slide feeder 10 is used to operate the slide actuator system 38 in the manner just described. However, in the embodiment shown and described herein, the control system 40 is also used to coordinate the operation of the document scanner 12 to allow one or more slides 16 positioned in the input slide tray 20 to be automatically sequentially scanned. More specifically, the control system 40 may be operated according to a method 52 illustrated in FIG. 8 in order to automatically and sequentially scan one or more slides 16.

A first step 54 in the method 52 is to confirm that the document scanner 12 is to be operated in a slide mode. Such an operational mode may be communicated to the document scanner 12 by the control system 40 according to any of a wide range of methods and communications protocols that are well-known in the art for controlling electronic systems and devices. Selection of the slide mode may be used to change certain settings on the document scanner 12 (e.g., exposure and color balance) as well as to limit the maximum travel of the scanner carriage 56 (FIGS. 1 and 2) of the scanner 12, since the entire platen 14 need not be scanned. During the next step of the process 52, i.e., step 58, the control system 40 determines whether a slide 16 is positioned in the scan tray 22. If no slide 16 is positioned in the scan tray 22, the process flow may continue to step 60 to determine whether any slides 16 remain in the input slide tray 20. If not, the process flow ends. If slides 16 remain in the input tray 20, as determined during step 60, the control system 40 performs step 62 and operates the slide actuator 38 as necessary to move a slide 16 from the input tray 20 into the scan tray 22. After the slide 16 has been properly positioned within the scan tray 22, the control system 40 performs step 64 and commands the scanner 12 to scan the slide 16. In the embodiment shown and described herein, the control system 40 may so command the scanner 12 by sending the appropriate command signals (not shown) to the document scanner 12. During the scanning process, the document scanner 12 may first actuate its internal light source 34 contained in the carriage 56 in order to produce the scanning light (represented by arrow 32) required to scan the slide 16. The scanner 12 may then move the carriage 56 in the scan direction 66 in order to scan the transparent image portion 36 contained in the slide 16 positioned in the scan tray 22. As the carriage 56 is moved in the scan direction 66, light 32 produced by the light source 34 contained in the moving carriage 56 is collected by mirror system 30 of automatic slide feeder 10 and directed through the transparent image portion 36 provided in the slide 16 positioned in the scan tray 22. See FIG. 3. Accordingly, the document scanner 12 is able to capture an image of the slide 16.

Once the slide 16 has been scanned, the control system performs step 68 to move the slide 16 from the scan tray 22 to the output slide tray 24. This may be accomplished by operating the slide actuator system 38 in the manner already described. If additional slides 16 remain in the input slide tray 20, then a new slide 16 will automatically be moved into position in the scan tray 22 as the most recently scanned slide 16 is moved to the output slide tray 24. If no additional slides 16 remain to be scanned, the process ends via step 60.

A significant advantage associated with the automatic slide feeder 10 according to the present invention is that it provides an easy and convenient way for a user to scan a plurality of individual slides, but without having to manually place each slide on the scanner platen and thereafter manually actuate the document scanner in order to scan the slide. Another advantage of the present invention is that it minimizes the chances that the slides will become damaged due to excessive handling since the slides to be scanned may be conveniently placed into the input slide tray all at once. After each of the slides has been scanned, the user may then remove all the scanned slides from the output slide tray.

Still other advantages are associated with the control system 40. For example, besides automatically controlling the operation of the slide actuator system 38, the control system 40 also interfaces with the document scanner 12 to control the function and operation thereof, and to coordinate the operation of the scanner 12 with the operation of the slide actuator system 38. The result is an integrated slide scanning system wherein the user may simply load the input slide tray 20 with slides, place the automatic slide feeder 10 on the platen 14 of scanner 12, and then initiate the scanning process. Then, after all of the slides 16 have been scanned, the user may simply remove the slides 16 from the automatic slide feeder 10, whereupon the slide feeder 10 will be ready to scan additional slides if need be.

Having briefly described the automatic slide feeder 10, as well as some of its more significant features and advantages, the various embodiments of the automatic slide feeder according to the present invention will now be described in detail. However, before proceeding with the description, it should be noted that while the automatic slide feeder 10 is shown and described herein as it could be used with a conventional "flatbed" reflective type scanner of the type well-known in the art, the automatic slide feeder 10 could be used with any of a wide range of scanner devices now known in the art or that may be developed in the future. Consequently, the automatic slide feeder 10 according to the present invention should not be regarded as limited to use with the particular type of scanner and in the particular applications shown and described herein.

Referring back now to FIGS. 1 and 2, one embodiment of an automatic slide feeder 10 according to the present invention is shown and described herein as it could be used with a conventional "flatbed" reflective-type document scanner 12 of the type that are well-known in the art and that are readily commercially available. For example, in the embodiment shown and described herein, the document scanner 12 may comprise a generally rectangularly shaped housing 70 sized to receive a transparent platen 14. A carriage 56 is moveably mounted within the housing 70 so that the same may be moved along a scan direction 66 in order to capture an image of an object (e.g., typically a document with graphics or text provided thereon) provided on the platen 14. The moveable carriage 56 may be provided with a light source or illumination system 34 suitable for illuminating the object to be scanned with scan light of an intensity sufficient to capture a high quality image of the object. The carriage 56 may also be provided with a suitable optical system (not shown) for capturing scan light reflected by the object and for producing electronic signals relating thereto. However, since document scanners of the type described above are well-known in the art and are readily commercially available, and since the details of such document scanners are not required to understand or practice the present invention, the particular document scanner 12 that may be used in conjunction with the automatic slide feeder 10 of the present invention will not be described in further detail herein.

The automatic slide feeder 10 may comprise a housing 18 sized and configured to define an input slide tray 20, a scan slide tray 22, and an output slide tray 24. The various slide trays 20, 22, and 24 may be arranged along a slide translation axis 26 so that the scan tray 22 is positioned between the input slide tray 20 and the output slide tray 24, as best seen in FIG. 2. Alternatively, other configurations are possible, as would be obvious to persons having ordinary skill in the art after having become familiar with the teachings of the present invention. For example, in another embodiment, the various slide trays 20, 22, and 24 could be arranged along a curved slide translation axis, in which case the slides 16 would follow a generally curved path from the input slide tray to the output slide tray. Regardless of the particular configuration of the slide translation axis 26 (e.g., either straight or curved), each of the slide trays 20, 22, and 24 are separated from the others by respective bulkheads 72 and 74 which terminate just above the floor or base 76 of housing 18, as best seen in FIGS. 4–7. A gap 78 between the floor 76 of housing 18 and each bulkhead 72 and 74 is sufficient to allow a single slide 16 to pass below each bulkhead 72, 74, but not so great as to allow more than one slide 16 to pass underneath the bulkheads 72 and 74. This configuration prevents more than one slide 16 at a time from being transferred between the various trays 20, 22, and 24.

The floor 76 of housing 18 should also be provided with an aperture or window 80 therein of a size sufficient to allow the transparent image area 36 provided on each slide 16 to be exposed to the optical system (not shown) contained within the document scanner 12. Finally, and as will be described in greater detail below, the floor section 76 that defines the output slide tray 24 may be provided with a pair of ramps 50 having a height sufficient to elevate the slide 16 contained in the output tray 24 so that the most recently scanned slide 16 contained in the scan tray 22 may be moved underneath the slide or slides 16 that are already contained in the output slide tray 24.

The housing 18 of automatic slide feeder 10 may also be formed so that it defines a generally triangularly-shaped mounting structure 28 for holding a mirror assembly 30. The mirror assembly 30 collects image light (represented by arrows 32) produced by a light source 34 contained within the document scanner 12 and reflects the image light 32 through a transparent image area 36 contained in the slide 16 that is positioned in the scan tray 22. See FIG. 3. In the embodiment shown and described herein, the mirror assembly 30 may comprise a first mirror portion 82 and a second mirror portion 84. The two mirror portions 82 and 84 are positioned so that scanning light 32 produced by the light source 34 provided in carriage 56 of scanner 12 is reflected to the second mirror 84 by the first mirror 82. Thereafter, second mirror 84 reflects the scanning light 32 through the transparent image area 36 provided on slide 16. The optical system (not shown) associated with the document scanner 12 thereafter receives the image light 32 and converts the same into electronic data signals in the manner well-known in the art. The bottom portion 76 of housing 18 in the area of the mirror mounting structure 28 may be provided with an aperture or window 86 having a size sufficient to allow scanning light 32 produced by the light source 34 in carriage 56 to be captured by the mirror assembly 30 in the manner just described.

In the embodiment shown and described herein, the two mirror portions 82 and 84 comprising mirror assembly 30 may be positioned and oriented with respect to one another and with respect to the moveable carriage 56 of the document scanner 12 in accordance with positions and orientations described in U.S. Pat. No. 5,463,217 entitled "Adapter for Scanning Transparencies with a Reflective Document Scanner" of Sobol et al. referred to above and which is incorporated herein by reference for all that it discloses. Alternatively, the mirrors 82 and 84 may be positioned and oriented according to the teachings disclosed in U.S. patent application Ser. No. 09/127,454, filed Jul. 31, 1998, entitled "Adjustable Adapter for Scanning Transparencies with a Reflective Document Scanner" of Batten, et al., which is also incorporated herein by reference for all that it discloses.

The housing 18 may be made from any of a wide range of materials, such as metals or plastics, suitable for the intended application, as would be obvious to persons having ordinary skill in the art after having become familiar with the teachings of the present invention. Consequently, the present invention should not be regarded as limited to housings comprising any particular material. However, by way of example, in one preferred embodiment, the housing 18 and various components thereof are molded from a thermoplastic material.

The slide actuator system 38 is best seen in FIG. 2 and may comprise a pawl 42 that is moveably mounted within housing 18 so that pawl 42 may be moved between a retracted position 44 and an extended position 44'. While any of a wide variety of actuator devices and systems may be used to move pawl 42 between the retracted and extended positions, in one preferred embodiment, the pawl 42 is mounted to a gear rack 46 which is in turn slidably mounted within the housing 18. Gear rack 46 may be caused to move back and forth between the retracted and extended positions 44 and 44' by a motor 48 driving a pinion gear 88 engaged with gear rack 46. The motor 48 may be connected to the control system 40 which is configured to control the operation of motor 48 according to the method 52 described in greater detail below.

The various components comprising the slide actuator system 38 may be made from any of a wide range of materials, such as metals or plastics, suitable for the intended application. By way of example, in one preferred embodiment, the pawl 42 and gear rack 46 are formed as a single piece from a thermoplastic material. Drive pinion 88 may comprise brass. In an alternate embodiment, drive pinion 88 may be molded from a thermoplastic material. The motor 48 may comprise any of a wide range of motors well-known in the art suitable for moving the pawl 42 back and forth in the manner described herein. By way of example, in one preferred embodiment, motor 48 may comprise a d.c. stepper motor of the type that is well-known in the art and readily commercially available.

The control system 40 may comprise an electronic control system suitable for controlling the operation of the motor 48 as well as for coordinating the operation of the automatic slide feeder with the document scanner 12 in the manner described herein. As such, the control system 40 may take on any of a wide variety of configurations and functions depending on the particular design of the slide actuator system 38 and depending on the requirements of the particular document scanner 12. However, since electronic control systems for accomplishing the required functions are well-known in the art and could be easily provided by persons having ordinary skill in the art after having become familiar with the teachings of the present invention, the particular control system 40 that may be utilized in one preferred embodiment of the invention will not be described in further detail herein.

As was briefly described above, the slide actuator system 38 is used to transfer slides 16 from the input slide tray 20 to the scan tray 22, and thereafter to the output slide tray 24. This transfer of slides between the various trays 20, 22, and 24 allows the automatic slide feeder 10 to automatically and sequentially position each of the slides 16 in the scan tray 22 so that each slide 16 may be scanned by the document scanner 12.

With reference now to FIGS. 4–7, consider the initial condition illustrated in FIG. 4 wherein a plurality of slides 16 are contained in the input slide tray 20. Suppose also that a slide 16 is positioned in the scan tray 22 and that another slide 16 is positioned in the output slide tray 24. After the slide 16 contained in the scan tray 22 has been scanned by the document scanner 12, it is necessary to move the slide 16 from the scan tray 22 to the output tray 24 so that a new slide 16 to be scanned may then be moved into position in the scan tray 22. This transfer of the slides 16 is accomplished by the slide actuator system 38.

Initially, the pawl 42 of the slide actuator system 38 is located in the retracted position 44, as best seen in FIGS. 2 and 4. When the pawl 42 is located in the retracted position, it may be adjacent, or even in abutting relation to, the bottom slide 16 contained in the input slide tray 20. When the slide actuator system 38 is actuated, it begins to move the pawl 42 toward the extended position 44' (illustrated in FIGS. 2 and 6). As the pawl 42 moves toward the extended position 44', it moves the lower-most slide 16 contained in the input slide tray 20 toward the scan tray 22. As this new slide 16 is moved into position, its leading edge contacts the trailing edge of the slide 16 that is already contained in the scan tray 22. This contact causes the most recently scanned slide 16 to be moved toward the left (i.e., toward the output slide tray 24). See FIG. 5. The pair of ramps 50 (only one of which is shown in FIGS. 4–7) provided on the floor 76 of housing 18 elevates the trailing edge of the slide 16 contained in the output slide tray 24, which allows the most recently scanned slide 16 to be moved underneath the slide 16 contained in the output slide tray 24. As the pawl 42 continues to move toward the extended position 44' (illustrated in FIGS. 2 and 6) it pushes both the slide 16 to be scanned and the most recently scanned slide 16 toward the scan and output trays 22 and 24, respectively, until the slide 16 to be scanned is positioned within the scan tray 22. At this time, the most recently scanned slide 16 will be positioned underneath the slide 16 contained in the output slide tray 24, as best seen in FIG. 6. Note that when the pawl 42 is in the fully extended position 44', the trailing edge of pawl 42 remains positioned underneath the lowest slide 16 contained in the input slide tray 20. This arrangement allows the pawl 42 to be returned to the retracted position 44 illustrated in FIG. 7 without moving the lower-most slide 16 contained in the input slide tray 20. Once the pawl 42 reaches the fully retracted position 44, the lower-most slide 16 contained in the input slide tray 20 drops down, which allows it to be subsequently moved into position in the scan tray 22.

The control system 40 provided in the automatic slide feeder 10 may be used to operate the slide actuator system 38 in the manner just described and also to coordinate the operation of the document scanner 12 to allow one or more slides 16 positioned in the input slide tray 20 to be automatically sequentially scanned. More specifically, the control system 40 may be operated according to a method 52 illustrated in FIG. 8.

The first step 54 in the method 52 confirms that the document scanner 12 is to be operated in a slide mode. Such an operational mode may be communicated to the document scanner 12 by the control system 40 according to any of a wide range of methods and signaling protocols well-known in the art for controlling electronic systems and devices. Selection of the slide mode may be used to change certain exposure and resolution settings on the document scanner 12 as well as to limit the maximum travel of the scanner carriage 56 (FIGS. 1 and 2) of the scanner 12, since the entire platen 14 need not be scanned. During the next step of the process 52, i.e., step 58, the control system 40 determines whether a slide 16 is positioned in the scan tray 22. If no slide 16 is positioned in the scan tray 22, the process flow continues to step 60 to determine whether any slides 16 are positioned in the input slide tray 20. If not, the process flow ends. If slides 16 are positioned in the input tray 20, the control system 40 performs step 62 to operate the slide actuator system 38 as necessary to move a slide 16 from the input tray 20 into the scan tray 22. After a slide 16 has been properly positioned within the scan tray 22, the control system 40 performs step 64 in order to scan the slide 16. In the embodiment shown and described herein, the control system 40 sends the appropriate command signals (not shown) to the document scanner 12 in order to initiate the scanning process. By way of example, when commanded to scan the slide 16, the document scanner 12 may first actuate the internal light source 34 contained in the carriage 56 in order to produce the scanning light 32 required to scan the slide 16. The scanner 12 may then move the carriage 56 in the scan direction 66 in order to scan the transparent image portion 36 contained in the slide 16 positioned in the scan tray 22. As the carriage 56 is moved in the scan direction 66, light 32 produced by the light source 34 contained in the carriage 56 is collected by mirror system 30 of automatic slide feeder 10 and directed through the transparent image portion 36 provided in the slide 16 positioned in the scan tray 22. See FIG. 3. Accordingly, the document scanner 12 is able to capture an image of the slide 16. Once the slide 16 has been scanned, the control system performs step 68 to move the slide 16 from the scan tray 22 to the output slide tray 24. This may be accomplished by operating the slide actuator system 38 in the manner already described. If additional slides 16 remain in the input slide tray 20, then a new slide 16 will automatically be moved into position in the scan tray 22 as the most recently scanned slide 16 is moved to the output slide tray 24. If no additional slides 16 remain to be scanned, then the process ends via step 60.

It is contemplated that the inventive concepts herein described may be variously otherwise embodied and it is intended that the appended claims be construed to include alternative embodiments of the invention except insofar as limited by the prior art.

What is claimed is:

1. An automatic slide feeder, comprising:
   a housing defining an input slide tray, an output slide tray and a scan slide tray;
   a slide actuator operatively associated with said housing, said slide actuator moving a slide from the input slide tray to the scan slide tray; and
   a control system operatively associated with said slide actuator and operatively associated with a document scanner, said control system operating the document scanner to scan a slide positioned in the scan slide tray and operating said slide actuator to move a new slide from the input slide tray to the scan slide tray after the slide positioned in the scan slide tray has been scanned.

2. The automatic slide feeder of claim 1, further comprising a mirror mounted to said housing, said mirror being positioned to reflect through the slide positioned in the scan tray scanning light produced by a light source associated with the document scanner.

3. The automatic slide feeder of claim 2, wherein said mirror comprises a first mirror portion and a second mirror portion, said first mirror portion reflecting to said second mirror portion light produced by the light source associated with the document scanner, said second mirror reflecting light from said first mirror through the slide positioned in the scan slide tray.

4. An automatic slide feeder, comprising:
   housing means for defining an input slide tray, an output slide tray and a scan slide tray;
   slide actuator means operatively associated with said housing means for moving a slide from the input slide tray to the scan slide tray; and
   control system means operatively associated with said slide actuator means and operatively associated with a document scanner for operating the document scanner to scan a slide positioned in the scan slide tray and for operating said slide actuator to move a new slide from the input slide tray to the scan slide tray after the slide positioned in the scan slide tray has been scanned.

5. The automatic slide feeder of claim 4, further comprising mirror means mounted to said housing means for reflecting through a slide positioned in the slide tray scanning light produced by a light source associated with the document scanner.

6. An automatic slide feeder, comprising:
a housing defining a base having a window therein, an input slide tray, an output slide tray and a scan slide tray, the scan slide tray being aligned with the window in the base so that a transparent image area on a slide positioned in the scan slide tray is visible through the window;
a slide actuator operatively associated with said housing, said slide actuator moving a slide from the input slide tray to the scan slide tray; and
a control system operatively associated with said slide actuator and operatively associated with a document scanner, said control system operating the document scanner to scan a slide positioned in the scan slide tray and operating said slide actuator to move a new slide from the input slide tray to the scan slide tray after the slide positioned in the scan slide tray has been scanned.

7. The automatic slide feeder of claim 6, wherein the base defined by said housing extends between the input slide tray and the output slide tray.

8. The automatic slide feeder of claim 7, further comprising a slide ramp positioned on the base of said housing in the output slide tray, said slide ramp elevating an end of the slide positioned in the output slide tray, the elevated end of the slide being located adjacent the scan slide tray, the elevated end of the slide allowing a slide positioned in the scan tray to be moved into position underneath the slide positioned in the output slide tray.

9. The automatic slide feeder of claim 7, further comprising a first bulkhead positioned between the input scan tray and the scan slide tray, the first bulkhead and the base defining a first gap therebetween, the first gap being sufficient to allow a single slide to pass between the input scan tray and the scan slide tray.

10. The automatic slide feeder of claim 9, further comprising a second bulkhead positioned between the scan slide tray and the output slide tray, the second bulkhead and the base defining a second gap therebetween, the second gap being sufficient to allow a single slide to pass between the scan slide tray and the output slide tray.

* * * * *